US010274755B2

(12) United States Patent
Han et al.

(10) Patent No.: US 10,274,755 B2
(45) Date of Patent: Apr. 30, 2019

(54) BEAM MODULATOR AND DISPLAY APPARATUS USING THE SAME (71) Applicant: SAMSUNG ELECTRONICS CO., LTD., Suwon-si (KR)

(72) Inventors: Seunghoon Han, Seoul (KR); Kanghee Won, Seoul (KR); Hongseok Lee, Seoul (KR); Jaeeun Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 242 days.

(21) Appl. No.: 15/102,400

(22) PCT Filed: Dec. 10, 2014

(86) PCT No.: PCT/KR2014/012108
§ 371 (c)(1),
(2) Date: Jun. 7, 2016

(87) PCT Pub. No.: WO2015/088236
PCT Pub. Date: Jun. 18, 2015

(65) Prior Publication Data
US 2016/0320640 A1 Nov. 3, 2016

(30) Foreign Application Priority Data
Dec. 11, 2013 (KR) .................. 10-2013-0154102

(51) Int. Cl.
G02B 5/30 (2006.01)
G02F 1/01 (2006.01)
(Continued)

(52) U.S. Cl.
CPC ......... G02F 1/0136 (2013.01); G02B 5/3083 (2013.01); G02B 27/22 (2013.01);
(Continued)

(58) Field of Classification Search
CPC .... G02F 1/0136; G02F 1/29; G02F 1/133528; G02F 1/13471; G02F 2203/07;
(Continued)

(56) References Cited

U.S. PATENT DOCUMENTS 7,270,416 B2 9/2007 Yamanaka et al.
2008/0204872 A1* 8/2008 Ijzerman ............ H04N 13/0404
359/463

(Continued)

FOREIGN PATENT DOCUMENTS

DE 10 2012 101 183 A1 8/2013
JP 2005-241870 A 9/2005

(Continued)

OTHER PUBLICATIONS

Communication dated Jul. 6, 2017 by the European Patent Office in counterpart European Patent Application No. 14869044.9.

(Continued)

Primary Examiner — Kimberly N. Kakalec
(74) Attorney, Agent, or Firm — Sughrue Mion, PLLC (57) ABSTRACT Disclosed are a beam combining/splitting modulator, a display apparatus including the same, and a spatial light modulation method. The beam combining/splitting modulator includes a light modulator including first and second modulation regions for modulating light, a polarization converter disposed at a side of an emitting surface of the light modulator and including a first transmissive region for polarizing and converting light incident from the first modulation region to have a first polarization and a second transmissive region for polarizing and converting light incident from the second modulation region to have a second polarization, a birefringence modulator disposed at the side of an emitting surface of the polarization converter and switching between a first state in which birefringence occurs (Continued)

and a second state in which birefringence does not occur, and a polarizer disposed at the side of an emitting surface of the birefringence modulator.

10 Claims, 4 Drawing Sheets (51) Int. Cl.
*G02F 1/29* (2006.01)
*G03H 1/02* (2006.01)
*G03H 1/08* (2006.01)
*G03H 1/22* (2006.01)
*G02B 27/22* (2018.01)
*G02B 27/28* (2006.01)
*G02F 1/1335* (2006.01)
*G02F 1/1347* (2006.01)
*G02F 1/13363* (2006.01)

(52) U.S. Cl.
CPC .......... *G02F 1/133528* (2013.01); *G02F 1/29* (2013.01); *G03H 1/2294* (2013.01); *G02B 27/285* (2013.01); *G02F 1/13471* (2013.01); *G02F 1/292* (2013.01); *G02F 2001/133538* (2013.01); *G02F 2001/133622* (2013.01); *G02F 2001/133638* (2013.01); *G02F 2203/01* (2013.01); *G02F 2203/02* (2013.01); *G02F 2203/07* (2013.01); *G02F 2413/09* (2013.01); *G03H 2001/0224* (2013.01); *G03H 2001/0858* (2013.01); *G03H 2223/19* (2013.01); *G03H 2223/20* (2013.01); *G03H 2223/22* (2013.01); *G03H 2225/33* (2013.01); *G03H 2225/36* (2013.01); *G03H 2225/55* (2013.01)

(58) Field of Classification Search
CPC .. G02F 2203/02; G02F 2203/01; G02F 1/292; G02F 2413/09; G02F 2001/133538; G02F 2001/133638; G02F 2001/133622; G02B 5/3083; G02B 27/22; G02B 27/285; G03H 1/2294; G03H 2225/55; G03H 2223/22; G03H 2223/20; G03H 2223/19; G03H 2001/0858; G03H 2225/36; G03H 2225/33; G03H 2001/0224

See application file for complete search history.

(56) References Cited

U.S. PATENT DOCUMENTS

| 2009/0244415 | A1 | 10/2009 | Ide |
| 2012/0092735 | A1 | 4/2012 | Futterer et al. |
| 2012/0236219 | A1 | 9/2012 | Kroll et al. |
| 2013/0094069 | A1 | 4/2013 | Lee et al. |
| 2013/0107148 | A1* | 5/2013 | Nomura ................ G02B 27/26 349/15 |
| 2013/0120817 | A1 | 5/2013 | Yoon et al. |

FOREIGN PATENT DOCUMENTS

| KR | 10-2010-0068615 A | 6/2010 | |
| KR | 10-2010-0137725 A | 12/2010 | |
| KR | 10-1208832 B1 | 12/2012 | |
| KR | 10-2013-0040073 A | 4/2013 | |
| KR | 10-2013-0053978 A | 5/2013 | |
| WO | 2010/149583 A1 | 12/2010 | |
| WO | WO 2012008408 A1 * | 1/2012 | ............. G02B 27/26 |

OTHER PUBLICATIONS

Yao et al., "Optical Negative Refraction in Bulk Metamaterials of Nonwires", Brevia, Aug. 2008, 4 pages total, vol. 321, Science Mag, www.sciencemag.org.

Reichelt et al., "Full-range, complex spatial light modulator for real-time holography", Optics Letters, Jun. 2012, 3 pages total, vol. 37 No. 11, Optical Society of America.

Written Opinion dated Feb. 9, 2015 issued by International Searching Authority in counterpart International Application No. PCT/KR2014/012108 (PCT/ISA/237).

International Search Report dated Feb. 9, 2015 issued by International Searching Authority in counterpart International Application No. PCT/KR2014/012108 (PCT/ISA/210).

* cited by examiner

BEAM MODULATOR AND DISPLAY APPARATUS USING THE SAME

TECHNICAL FIELD

The present disclosure relates to a beam combining/splitting modulator, a display apparatus using the same, and a spatial light modulation method.

BACKGROUND ART

In recent years, many three-dimensional (3D) movies are appearing, and thus many techniques related to 3D image display apparatuses are being studied. Since the 3D image display apparatuses display 3D images based on binocular parallax, 3D image display apparatuses which are being currently commercialized use binocular parallax of two eyes of a viewer. As a left-eye image and a right-eye image having different viewpoints are provided to the left and right eyes of a viewer, the viewer may perceive a stereoscopic effect. Such 3D image display apparatuses may include glasses type 3D image display apparatuses for which special glasses are necessary and non-glasses type 3D image display apparatuses for which glasses are not necessary.

However, when the viewer watches a 3D image displayed in a binocular parallax fashion, the viewer's eyes feel very tired, and 3D image display apparatuses configured to provide only two viewpoints, i.e., a left-eye image and a right-eye image, do not reflect a viewpoint change according to the movement of the viewer. As such, there is a limitation in providing a natural stereoscopic effect to the viewer.

In order to display more natural stereoscopic images, holographic display apparatuses are being studied. Light may be considered to be waves having amplitude information and phase information. A holography technique controls a phase and an amplitude of light to display an image. Accordingly, in the holographic display apparatuses, a device capable of controlling an amplitude (intensity) and a phase of light is necessary.

DISCLOSURE OF INVENTION

Technical Problem

In the holographic display apparatuses, a device capable of controlling an amplitude (intensity) and a phase of light is necessary.

Solution to Problem

Provided is a beam combining/splitting modulator capable of selectively combining or splitting light.

Provided is a complex spatial light modulator capable of controlling both an amplitude and a phase of light by using the beam combining/splitting modulator, and having high light efficiency.

Provided is a display apparatus configured to display an image by using the beam combining/splitting modulator.

Provided is a spatial light modulation method for modulating a phase and an intensity of light by using the beam combining/splitting modulator.

Additional aspects will be set forth in part in the description which follows and, in part, will be apparent from the description, or may be learned by practice of the presented embodiments.

BRIEF DESCRIPTION OF DRAWINGS

These and/or other aspects will become apparent and more readily appreciated from the following description of the embodiments, taken in conjunction with the accompanying drawings in which.

BEST MODE FOR CARRYING OUT THE INVENTION

According to an aspect of the present invention, a beam combining/splitting modulator may include: a light modulator including first and second modulation regions for modulating light; a polarization converter disposed at a side of an emitting surface of the light modulator, and including a first transmissive region for polarizing and converting light incident from the first modulation region to have a first polarization and a second transmissive region for polarizing and converting light incident from the second modulation region to have a second polarization; a birefringence modulator disposed at the side of an emitting surface of the polarization converter, and switching between a first state in which birefringence occurs and a second state in which birefringence does not occur; and a polarizer disposed at the side of an emitting surface of the birefringence modulator.

When the birefringence modulator is in the first state, a light path of at least one light of the light incident from the first modulation region and the light incident from the second modulation region may be changed in the birefringence modulator, the incident lights are combined, and the combined light is emitted from the birefringence modulator, and when the birefringence modulator is in the second state, the light incident from the first modulation region and the light incident from the second modulation region may be emitted from the birefringence modulator without any change of light paths thereof.

The birefringence modulator may include a liquid crystal layer in which birefringence occurs according to a voltage applied thereto.

Each of the first and second modulation regions of the light modulator may be a transmissive phase spatial light modulator which independently modulates a phase of incident light.

Light passing through the light modulator may have a first polarization, and a first transmissive region of the polarization converter may have no retardation, and a second transmissive region of the polarization converter may be a region of a half-wave plate for retarding a half-wave phase.

A polarization axis of the polarizer may be inclined with respect to the first and second polarization.

According to another aspect of the present invention, a beam combining/splitting modulator may include: a polarizer on which light is incident; a birefringence modulator disposed at a rear side of the polarizer and switching between a first state in which birefringence occurs and a second state in which birefringence does not occur; and a light modulator disposed at a rear side of the birefringence modulator, and including first and second modulation regions for modulating light incident from the birefringence modulator and reflecting the modulated light to the birefringence modulator.

When the birefringence modulator is in the first state, light polarized in the polarizer may be splitted into first light of first polarization and second light of second polarization in the birefringence modulator, the first and second light may be incident on the first and second modulation regions of the light modulator, the first and second light may be modulated in the first and second modulation regions of the light modulator, the first and second light may be incident again on and recombined in the birefringence modulator, and the recombined light may be emitted through the polarizer, and when the birefringence modulator is in the second state, light polarized in the polarizer may be incident on the light modulator without being splitted in the birefringence modulator, may be modulated in the light modulator, and may be emitted through the polarizer via the birefringence modulator.

The birefringence modulator may include a liquid crystal layer in which birefringence occurs according to a voltage applied thereto.

The light modulator may be a reflective phase spatial light modulator for modulating a phase of incident light.

A polarization axis of the polarizer may be inclined with respect to the first and second polarization, and light passing through the polarizer may include both a component of light passing through the first modulation region and a component of light passing through the second modulation region.

According to still another aspect of the present invention, a beam combining/splitting modulator may include: a pixel array which is displayed by a beam combining/splitting modulator and in which a plurality of pixels are arranged in a two-dimensional fashion, wherein the beam combining/splitting modulator includes a light modulator including first and second modulation regions for modulating light; a polarization converter disposed at a side of an emitting surface of the light modulator, and including a first transmissive region for polarizing and converting light incident from the first modulation region to have a first polarization and a second transmissive region for polarizing and converting light incident from the second modulation region to have a second polarization; a birefringence modulator disposed at the side of an emitting surface of the polarization converter, and switching between a first state in which birefringence occurs and a second state in which birefringence does not occur; and a polarizer disposed at the side of an emitting surface of the birefringence modulator, wherein each of the plurality of pixels of the pixel array includes the first and second modulation regions of the light modulator, and wherein an image is displayed by modulating a phase and an intensity of light according to a combination of light modulated in the first and second modulation regions of the light modulator.

According to yet another aspect of the present invention, a beam combining/splitting modulator may include: a pixel array which is displayed by a beam combining/splitting modulator and in which a plurality of pixels are arranged in a two-dimensional fashion, wherein the beam combining/splitting modulator includes a polarizer on which light is incident; a birefringence modulator disposed at a rear side of the polarizer, and switching between a first state in which birefringence occurs and a second state in which birefringence does not occur; and a light modulator disposed at a rear side of the birefringence modulator, and including first and second modulation regions for modulating light incident from the birefringence modulator and reflecting the modulated light to the birefringence modulator, wherein each of the plurality of pixels of the pixel array includes the first and second modulation regions of the light modulator, and wherein an image is displayed by modulating a phase and an intensity of light according to a combination of light modulated in the first and second modulation regions of the light modulator.

According to still yet another aspect of the present invention, a beam combining/splitting modulator may include: a display panel including a pixel array which is displayed by a beam combining/splitting modulator and in which a plurality of pixels are arranged in a two-dimensional fashion, wherein the beam combining/splitting modulator includes a light modulator including first and second modulation regions for modulating light; a polarization converter disposed at a side of an emitting surface of the light modulator, and including a first transmissive region for polarizing and converting light incident from the first modulation region to have a first polarization and a second transmissive region for polarizing and converting light incident from the second modulation to have a second polarization; a birefringence modulator disposed at the side of an emitting surface of the polarization converter, and switching between a first state in which birefringence occurs and a second state in which birefringence does not occur; and a polarizer disposed at the side of an emitting surface of the birefringence modulator, wherein each of the plurality of pixels of the pixel array includes the first and second modulation regions of the light modulator, and wherein an image is displayed by modulating a phase and an intensity of light according to a combination of light modulated in the first and second modulation regions of the light modulator, thereby adjusting a phase and an intensity of light emitted in front of the display panel.

The display apparatus may be a holographic display apparatus for modulating a phase and an intensity of light emitted from the display panel to display a hologram image.

The display panel may display a two-dimensional (2D) image that is a one-view image regardless of a phase of emitting light.

A phase and an intensity of light emitted from the display panel may be selectively adjustable for switching between a 2D image and a three-dimensional (3D) image.

According to still yet another aspect of the present invention, a beam combining/splitting modulator may include: a display panel including a pixel array which is displayed by a beam combining/splitting modulator and in which a plurality of pixels are arranged in a two-dimensional fashion, wherein the beam combining/splitting modulator may includes: a polarizer on which light is incident; a birefringence modulator disposed at a rear side of the polarizer, and switching between a first state in which birefringence occurs and a second state in which birefringence does not occur; and a light modulator configured to be disposed at a rear side of the birefringence modulator, and including first and second modulation regions for modulating light incident from the birefringence modulator and reflecting the modulated light to the birefringence modulator, wherein each of the plurality of pixels of the pixel array includes the first and second modulation regions of the light modulator, and wherein an image is displayed by modulating a phase and an intensity of light according to a combination of light modulated in the first and second modulation regions of the light modulator, thereby adjusting a phase and an intensity of light emitted in front of the display panel.

The display apparatus may be a holographic display apparatus for modulating a phase and an intensity of light emitted from the display panel to display a hologram image.

The display panel may display a two-dimensional (2D) image that is a one-view image regardless of a phase of emitting light.

A phase and an intensity of light emitted from the display panel may be selectively adjustable for switching between a 2D image and a three-dimensional (3D) image.

According to still yet another aspect of the present invention, a beam combining/splitting modulator may include: modulating light incident on first and second modulation regions of a light modulator; polarizing and converting, by a polarization converter, light passing through the first modulation region to have a first polarization and light passing through the second modulation region to have a second polarization; causing the polarized and converted light to be incident on a birefringence modulator; controlling the birefringence modulator so that the birefringence modulator is in any one of a first state in which birefringence occurs and a second state in which birefringence dose not occur; and passing light that has passed through the birefringence modulator through a polarizer.

When the birefringence modulator is in the first state, a light path of at least one of light incident from the first modulation region and light incident from the second modulation region may be changed in the birefringence modulator, the incident lights may be combined, and the combined light may be emitted from the birefringence modulator, and when the birefringence modulator is in the second state, light incident from the first modulation region and light incident from the second modulation region may be emitted from the birefringence modulator without any changed of changing light paths thereof.

According to still yet another aspect of the present invention, a beam combining/splitting modulator may include: passing incident light through a polarizer; causing the light passing through the polarizer to be incident on a birefringence modulator; controlling the birefringence modulator so that the birefringence modulator is in any one of a first state in which birefringence occurs and a second state in which birefringence dose not occur; causing light passing through the birefringence modulator to be incident on first and second modulation regions of a light modulator; modulating and reflecting light incident on first and second modulation regions of the light modulator; causing the reflected light to be again incident on the birefringence modulator; and passing light that has passed through the birefringence modulator again through the polarizer.

When the birefringence modulator is in the first state, light polarized in the polarizer may be separated into first light of first polarization and second light of second polarization in the birefringence modulator, the separated lights may be incident on first and second modulation regions of the light modulator, the incident lights may be modulated in first and second modulation regions of the light modulator, the modulated lights may be incident again on and recombined in the birefringence modulator, and the recombined light may be emitted through the polarizer, and when the birefringence modulator is in the second state, light polarized in the polarizer may be incident on the light modulator without being separated in the birefringence modulator, may be modulated in the light modulator, and may be emitted through the polarizer via the birefringence modulator.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, exemplary embodiments of the present invention will be described in detail with reference to the accompanying drawings. In the following drawings, the same reference numerals indicate the same components, and in the drawings, sizes of elements may be exaggerated for clarity and convenience of the description.

Figure 1:
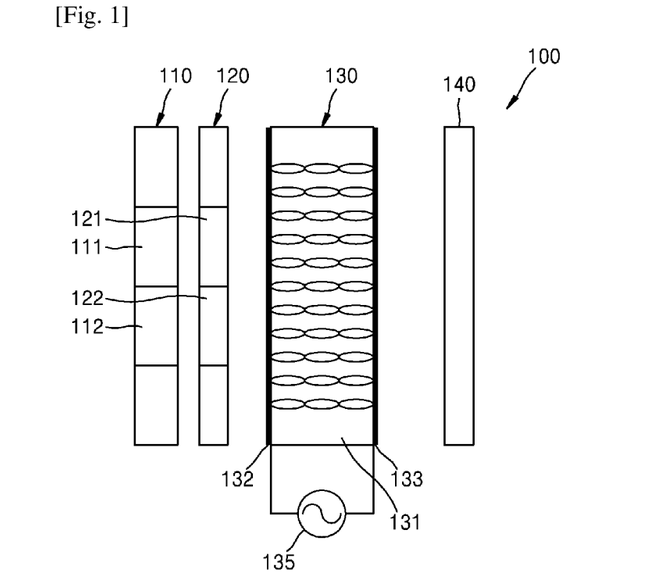
FIG. 1 schematically shows a beam combining/splitting modulator according to an embodiment of the present invention.

FIG. 1 schematically shows a beam combining/splitting modulator 100 according to an embodiment of the present invention.

A beam combining/splitting modulator 100 of the present embodiment may include a light modulator 110, a polarization converter 120, a birefringence modulator 130, and a polarizer 140.

The light modulator 110 may include a first modulation region 111 and a second modulation region 112 which independently modulate light. The first modulation region 111 and the second modulation region 112 may independently modulate a phase of light. Light passing through the light modulator 110 may have a predetermined polarized state. For example, light emitted from the light modulator 110 may be linearly polarized light. A polarization direction of light emitted from the light modulator 110 may be considered as, for example, an s-polarized wave in relation to the birefringence modulator 130 which will be described later. The light modulator 110 may be a known transmissive phase spatial light modulator. As an example, the light modulator 110 may be a light modulator for a parallel-aligned nematic-liquid-crystal (PAL) panel. The PAL panel may be configured so that rubbing directions (that is, orientation directions of liquid crystal) of upper and lower plates are parallel to each other (at180°). When liquid crystal is oriented by performing rubbing in directions in which the upper and lower plates are anti-parallel a positive type liquid crystal may be used. As such, when a voltage is applied, the liquid crystal may stand at a tilt angle perpendicular to the upper and lower plates without twisting. Therefore, phase modulation and control of a birefringence state may be possible without changing amplitude. As another example, the light modulator 110 may be a light modulator for a vertically aligned (VA) LC (liquid-crystal) panel. Even though the VA LC panel has an initial orientation of a liquid crystal perpendicular to the upper and lower plates, a negative type liquid crystal may be used. As such, when a voltage is applied, the liquid crystal may be reoriented in a direction perpendicular to an electric field. Therefore, even in this case, phase modulation and control of a birefringence state may be possible without twisting the liquid crystal.

The polarization converter 120 may be disposed at a side of an emitting surface of the light modulator 110. The polarization converter 120 may include a first transmissive region 121 and a second transmissive region 122. The first transmissive region 121 may be a region corresponding to the first modulation region 111 of the light modulator 110, and may polarize and convert light (hereinafter, referred to as first light) L1 incident from the first modulation region 111 of the light modulator 110 so that the light L1 have a first polarization (for example, s-polarization). The second transmissive region 122 may be a region corresponding to the second modulation region 112 of the light modulator 110, and may polarize and convert light (hereinafter, referred to as second light) L2 incident from the second modulation region 112 of the light modulator 110 so that the light L2 have a second polarization (for example, p-polarization). The meaning of polarizing and converting light may be broadly considered to include maintaining polarization of incident light. As an example, the first transmissive region 121 of the polarization converter 120 may have no retardation of phase, and the second transmissive region 122 of the polarization converter 120 may be a region of a half-wave plate for retarding a half-wave phase.

The birefringence modulator 130 may be disposed at the side of the emitting surface of the polarization converter 120. The birefringence modulator 130 may be an active modulator which may switch between a first state in which birefringence occurs and a second state in which birefringence does not occur. The birefringence modulator 130 may include a liquid crystal layer 131 in which birefringence occurs according to a voltage applied thereto from a drive control unit 135, and electrode layers 132 and 133 which apply a voltage to both ends of the liquid crystal layer 131. Since the liquid crystal layer 131 of the birefringence modulator 130 may function to branch light or couple lights when the liquid crystal layer 131 is in birefringent state as will be described later, a thickness (T1 of FIG. 2A) of the liquid crystal layer 131 may be designed to sufficiently branch or couple a light path changed by birefringence of the liquid crystal layer 131 as will be described later.

The polarizer 140 may be disposed at the side of the emitting surface of the birefringence modulator 130. A polarization axis of the polarizer 140 may be inclined with respect to the first polarization and the second polarization. In other words, the polarizer 140 may be installed so that light passing through the polarizer 140 include both a projection component with respect to the polarization axis of the first polarization and a projection component with respect to the polarization axis of the second polarization. As an example, when the first polarization is s-polarization, and the second polarization is p-polarization, the polarization axis of the polarizer 140 may be installed so as to be inclined with respect to both an s-polarization direction and a p-polarization direction.

On the other hand, the light modulator 110, the polarization converter 120, the birefringence modulator 130, and the polarizer 140 may all form a flat panel structure. The beam combining/splitting modulator 100 may be integrated into one flat panel using a known liquid crystal panel manufacturing process.

Figure 2A:
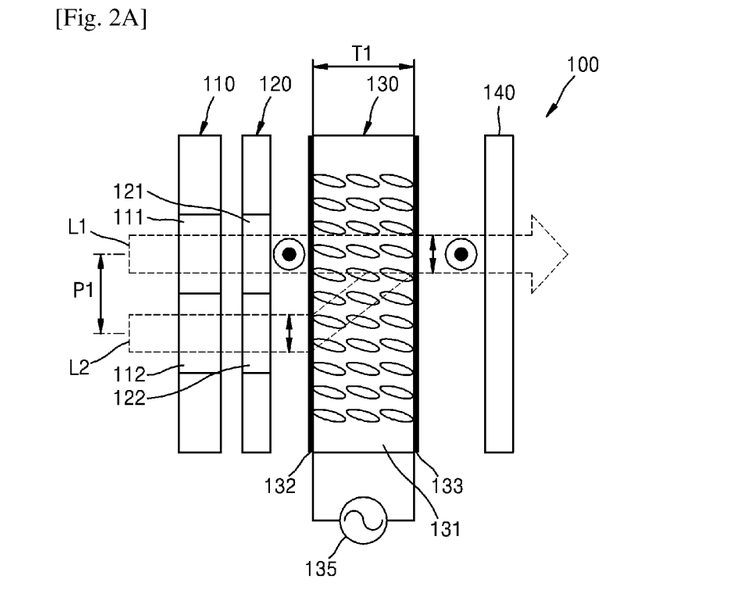
FIGS. 2A and 2B are views for describing an operation of the beam combining/splitting modulator of FIG. 1.
Figure 2B:
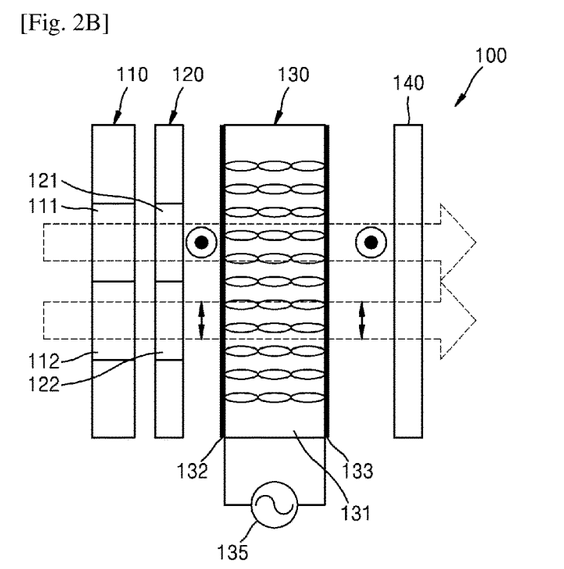

Next, a spatial light modulation method for use with the beam combining/splitting modulator 100 will be described with reference to FIGS. 2A and 2B. FIG. 2A shows the birefringence modulator 130 in a first state in which birefringence occurs, and FIG. 2B shows when the birefringence modulator 130 is in a second state in which birefringence does not occur.

First, referring to FIG. 2A, first light L1 incident on the first modulation region 111 of the light modulator 110 may be incident on the first transmissive region 121 of the polarization converter 120 in a modulated state. Similarly, second light L2 incident on the second modulation region 112 of the light modulator 110 may be incident on the second transmissive region 122 of the polarization converter 120 in a modulated state. The light modulator 110 may independently modulate phases of the first light L1 and the second light L2. Each of the first light L1 and the second light L2 emitted from the light modulator 110 may include first polarization (for example, s-polarization).

The first light L1 incident on the first transmissive region 121 of the polarization converter 120 is emitted in a state in which the first polarization (for example, s-polarization) is maintained. The second light L2 incident on the second transmissive region 122 of the polarization converter 120 may be light undergoing retardation to include second polarization (for example, p-polarization).

The birefringence modulator 130 may be in the first state (that is, a state in which birefringence occurs) according to a voltage applied thereto.

In general, light passing through a birefringent body may have different velocities according to a polarization direction thereof. A birefringent medium may be of a uniaxial type or a biaxial type. The liquid crystal layer 131 of the birefringence modulator 130 of the present invention is not limited to a particular type of birefringence. In the present embodiment, a case in which the liquid crystal layer 131 is uniaxially birefringent will be described as an example.

When the birefringence modulator 130 is in a first state (birefringent), an ordinary ray having a polarization direction perpendicular to an optical axis that is an axis of rotational symmetry of the liquid crystal layer 131 and an extraordinary ray having a polarization direction that is not perpendicular to the optical axis of the liquid crystal layer 131 may have different velocities. Therefore, when the birefringence modulator 130 is in the first state (birefringent), the first light L1 may be incident on the birefringence modulator 130 so that the first polarization of the first light L1 is perpendicular to a birefringent optical axis of the birefringence modulator 130, and the second light L2 may be incident on the birefringence modulator 130 in a state in which the second polarization of the second light L2 is inclined with respect to the birefringent optical axis of the birefringence modulator 130. The first light L1 and the second light L2 may have different velocities in the liquid crystal layer 131 of the birefringence modulator 130 and thus have different light paths. When the first light L1 is incident perpendicular to the birefringence modulator 130 in a state in which the first light L1 becomes a first polarization (s-polarization), and the second light L2 is incident perpendicular to the birefringence modulator 130 in a state in which the second light L2 becomes a second polarization (p-polarization), the first light L1 may undergo normal refraction and thus travel in the liquid crystal layer 131 in a straight line without being refracted, and then may be emitted from the liquid crystal layer 131. However, the second light L2 may be refracted by subnormal refraction in the liquid crystal layer 131 due to birefringence of the birefringence modulator 130, and then may be emitted from the liquid crystal layer 131. Therefore, a pitch interval P1 between the first modulation region 111 of the light modulator 110 (and the first transmissive region 121 of the polarization converter 120) and the second modulation region of the light modulator 110 (and the second transmissive region 122 of the polarization converter 120), and a thickness (T1) of the liquid crystal layer 131 of the birefringence modulator 130 are appropriately designed, the second light L2 may be emitted from the birefringence modulator 130 in a state in which the second light L2 is refracted to be combined with the first light L1.

Accordingly, as shown in the drawings, when the birefringence modulator 130 is in the first state (birefringent), the first and second light L1 and L2 passing through the birefringence modulator 130 may be emitted from the birefringence modulator 130 in a state in which the first and second light L1 and L2 are combined into one light that may be incident on the polarizer 140.

Since the polarization axis of the polarizer 140 is inclined with respect to the first polarization and the second polarization, the light passing through the polarizer 140 may be provided as a component of a polarization direction of the polarizer 140 of the first light L1 and the second light L2. In order words, a phase of the light passing through the polarizer 140 may be provided as a function of a modulated phase of the first light L1 and a modulated phase of the second light L2. In addition, a magnitude of the light passing through the polarizer 140 may be provided as a sum of a projection component of a first polarization direction (for example, an s direction) of the first light L1 and a projection component of a second polarization direction (for example, a p direction) of the second light L2, and this magnitude may also be provided as a function of the modulated phase of the first light L1 and the modulated phase of the second light L2. Therefore, a phase and an intensity of emitted light may be independently controlled by phase modulation of the first modulation region 111 and the second modulation region 112 of the light modulator 110.

Next, referring to FIG. 2B, when the birefringence modulator 130 is in the second state (that is, the state in which birefringence does not occur), the first light L1 and the second light L2 may be emitted from the birefringence modulator 130 without any change of a light path in the birefringence modulator 130. Therefore, the first light L1 and the second light L2 may be emitted through the polarizer 140 in a state in which the first light L1 and the second light L2 are separated from each other.

As described above, the beam combining/splitting modulator 100 of the present embodiment may selectively control the birefringence modulator 130 in the first state (birefringent) and the second state (non-birefringent). In this case, when the birefringence modulator 130 is controlled in the first state, the first light L1 and the second light L2 incident on the beam combining/splitting modulator 100 may be combined and emitted, and an intensity and a phase of emitted light may be independently modulated. When the birefringence modulator 130 is controlled in the second state, the first light L1 and the second light L2 incident on the beam combining/splitting modulator 100 may be individually emitted.

Figure 3:
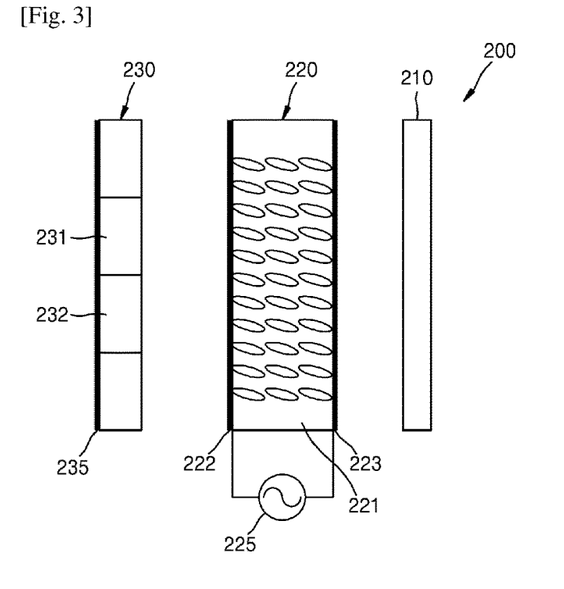
FIG. 3 schematically shows a beam combining/splitting modulator according to another embodiment of the present invention.

FIG. 3 schematically shows a beam combining/splitting modulator 200 according to another embodiment of the present invention.

A beam combining/splitting modulator 200 of the present embodiment may include a polarizer 210, a birefringence modulator 220, and a light modulator 230. The polarizer 210 may be a member configured to transmit light polarized in a predetermined direction (for example, linearly polarized light). The birefringence modulator 220 may be disposed at a rear side of the polarizer 210. In this case, a side on which light is incident from the outside or a light source is referred to as a front side of the polarizer 210. As will be described later, incident light may be emitted again into the front of the polarizer 210 via the birefringence modulator 220 and the light modulator 230.

The birefringence modulator 220 may be switch between the first state in which birefringence occurs and the second state in which birefringence does not occur. The birefringence modulator 220 may include a liquid crystal layer 221 in which birefringence occurs according to a voltage applied thereto by a drive control unit 225, and electrode layers 222 and 223 which apply a voltage to both ends of the liquid crystal layer 221. As will be described later, the liquid crystal layer 221 of the birefringence modulator 220 functions to branch a light path or combine light paths when the liquid crystal layer 221 is birefringent. A thickness (T2 of FIG. 4A) of the liquid crystal layer 221 of the birefringence modulator 220 and a pitch interval (P2 of FIG. 4A) of a first modulation region 231 and a second modulation region 232 of the light modulator 230 may be designed to sufficiently branch or couple a light path changed by birefringence of the liquid crystal layer 221 as will be described later.

The light modulator 230 may be disposed at a rear side of the birefringence modulator 220. The light modulator 230 may include the first modulation region 231 and the second modulation region 232 which independently modulate light. The first modulation region 231 and the second modulation region 232 may be regions on which the first light L1 and the second light L2, into which the light path is separated when the birefringence modulator 220 is in the first state as will be described later, are incident. The first modulation region 231 and the second modulation region 232 may reflect light while independently modulating a phase of the light. The light modulator 230 may be a known reflective phase spatial light modulator. Light incident on or reflected from the light modulator 230 may remain in a polarized state as it is.

On the other hand, the polarizer 210, the birefringence modulator 220, the light modulator 230 may all form a flat panel structure, and the beam combining/splitting modulator 200 may be integrated in one flat panel using a known liquid crystal panel manufacturing process.

Figure 4A:
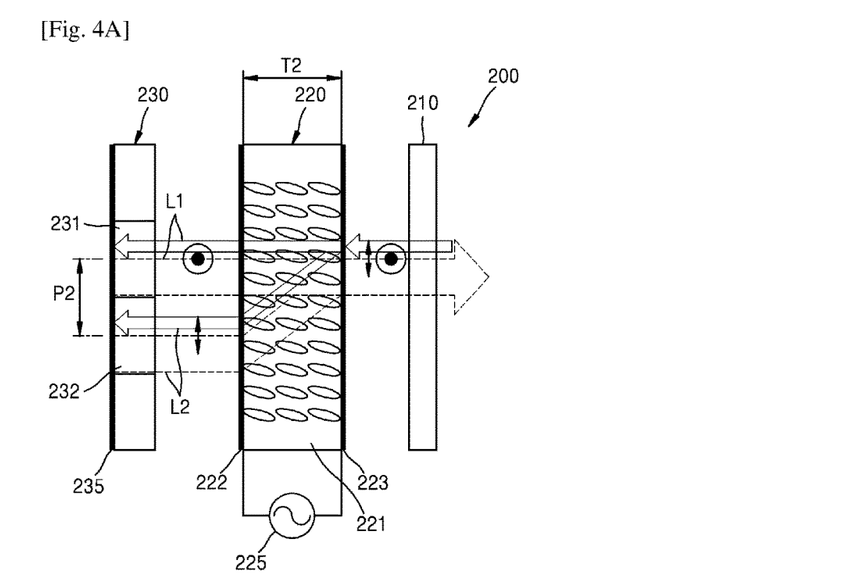
FIGS. 4A and 4B are views for describing an operation of the beam combining/splitting modulator of FIG. 3.

Next, an operation of the beam combining/splitting modulator 200 of the present embodiment will be described with reference to FIGS. 4A and 4B. FIG. 4A shows when the birefringence modulator 220 is in a first state in which birefringence occurs, and FIG. 4B shows when the birefringence modulator 220 is in a second state in which birefringence does not occur.

First, referring to FIG. 4A, light passing through the polarizer 210 may be light polarized in a predetermined direction. As an example, the light may be linearly polarized light having s-polarization or p-polarization components. In this case, the s-polarization and the p-polarization may be determined based on a birefringent optical axis of the birefringence modulator 220.

The birefringence modulator 220 may be in the first state (that is, a state in which birefringence occurs) according to a voltage applied thereto. When the birefringence modulator 220 is in the first state (birefringent), first light L1 having a polarization direction (s-polarization) perpendicular to an optical axis that is an axis of rotational symmetry of a liquid crystal layer 221 travels in a straight line without being refracted in the liquid crystal layer 221, but second light L2 having a polarization direction (p-polarization) that is not perpendicular to the optical axis of the liquid crystal layer 221 may be refracted in the liquid crystal layer 221. As a result, the first light L1 and the second light L2 may be emitted from the birefringence modulator 220 in a state in which the first light L1 and the second light L2 are separated from each other. Each of the first light L1 and the second light L2 emitted from the birefringence modulator 220 may be incident on a first modulation region 231 and a second modulation region 232 of the light modulator 230. The first light L1 and the second light L2 incident on each of the first modulation region 231 and the second modulation region 232 of the light modulator 230 may independently undergo phase modulation, may be reflected, and may be incident again on the birefringence modulator 220. The first light L1 and the second light L2 that are incident again on a rear side of the birefringence modulator 220 may travel in an opposite direction along the light path before separation, and may be emitted from a front side of the birefringence modulator 220 in a state in which the first light L1 and the second light L2 are combined with each other. The first and second light L1 and L2 passing through the birefringence modulator 220 may be emitted in a state in which the first and second light L1 and L2 are combined with each other and may be incident again on the polarizer 210. Since a polarization axis of the polarizer 210 is installed to be inclined with respect to first polarization of the first light L1 and second polarization of the second light L2, the light passing through the polarizer 210 may be provided as components of polarization directions of the polarizer 210 of the first light L1 and the second light L2. That is, a phase of a size of the light passing through the polarizer 210 may be provided as a function of a modulated phase of the first light L1 and a modulated phase of the second light L2.

Figure 4B:
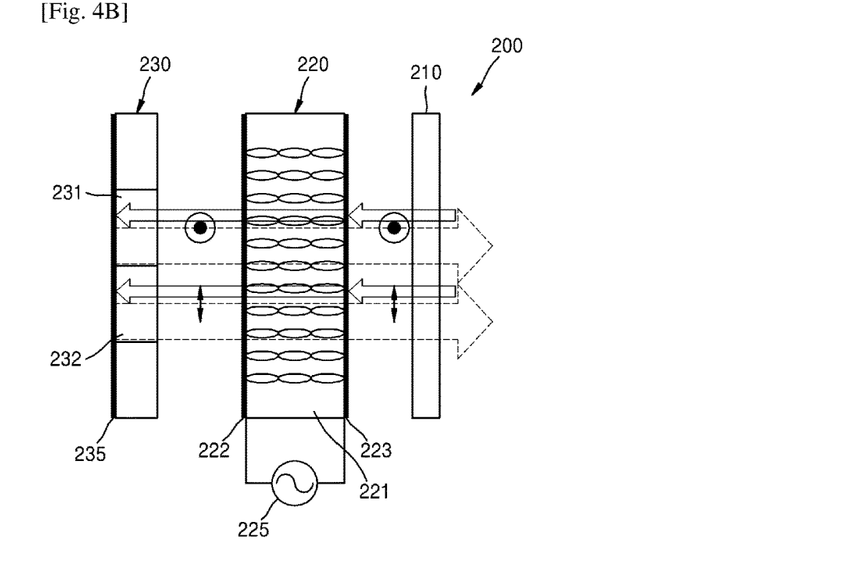

Next, referring to FIG. 4B, when the birefringence modulator 220 is in the second state (that is, a state in which birefringence does not occur), the light incident from the front side of the polarizer 210 may be incident on the light modulator 230 without any change of a light path in the birefringence modulator 220. The light incident on the first modulation region 231 and the second modulation region 232 of the light modulator 230 may be emitted again via the polarizer 210 without any change of the light path in the birefringence modulator 220.

As described above, according to the beam combining/splitting modulator 200 of the present embodiment, an intensity and a phase of the light incident from the front side of the polarizer 210 may be understood to be independently modulated while the light is emitted again in front of the polarizer 210.

According to the beam combining/splitting modulators 100 and 200 of the above-mentioned embodiments, since two incident lights may be emitted in a state in which the lights are combined or separated, the beam combining/splitting modulators 100 and 200 may each operate as an active polarization beam combiner/splitter.

Figure 5:
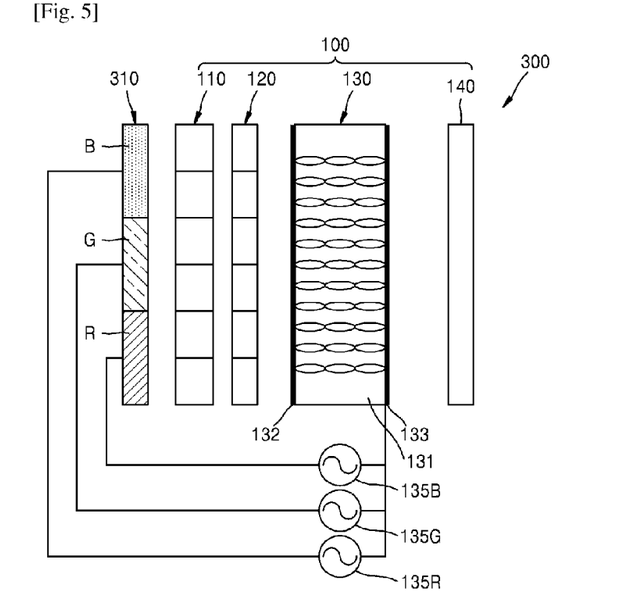
FIG. 5 schematically shows a display panel according to still another embodiment of the present invention.
Figure 6:
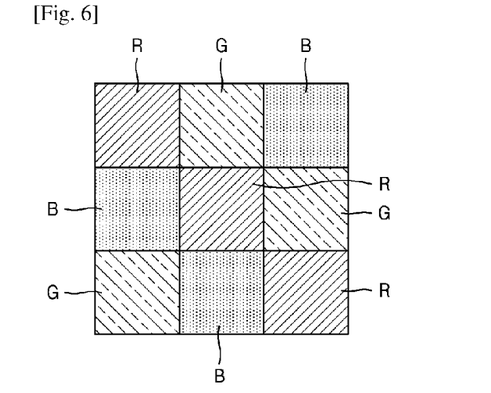
FIG. 6 shows an example of a pixel array of the display panel of FIG. 5.

FIG. 5 schematically shows a display panel 300 according to still another embodiment of the present invention, and FIG. 6 shows an example of a pixel array of the display panel 300.

Referring to FIGS. 5 and 6, a display panel 300 of the present embodiment may be an application of the beam combining/splitting modulators according to the above-mentioned embodiments. For example, the display panel 300 may include a pixel array having a plurality of pixels arranged in a two-dimensional fashion, and each pixel of the pixel array may include the beam combining/splitting modulator (100 of FIG. 1) of the above-mentioned embodiment. In addition, the display panel 300 of the present embodiment may further include a color filter 310. When the color filter 310 is further provided, red (R), green (G) and blue (B) subpixels or just some of these may form a pixel. According to the red (R), the green (G), and the blue (B) subpixels, the light modulator 110 described above may include first and second modulation regions 111 and 112, first and second transmissive regions 121 and 122 of a polarization converter 120, a birefringence modulator 130, and a polarizer 140. The birefringence modulator 130 may be driven according to the red (R), the green (G), and the blue (B) subpixels or integrally. It may also be possible to display a color in a time division scheme performed by sequentially driving red, green, and blue light sources, instead of a spatial division scheme using the color filter 310.

As described above, since the beam combining/splitting modulator 100 may combine two incident lights to independently control the phase and intensity of the light, the phase and the intensity of the emitted light may be controlled according to each pixel (or subpixel). Therefore, the display panel 300 of the present embodiment may be used as a hologram display panel displaying a computer generated hologram (CGH). Furthermore, the display panel 300 of the present embodiment may also function as a multi-way three dimensional (3D) display panel providing multi-views by appropriately controlling a phase of light. In addition, in the display panel 300 of the present embodiment, the beam combining/splitting modulator 100 may also display a two-dimensional (2D) image by controlling only an intensity of emitted light. When a 2D image is displayed (that is, when only an intensity of light is modulated), the first and second modulation regions 111 and 112 of the light modulator 110 may individually correspond to pixels (or subpixels). Thus, a resolution of the 2D image may be twice that of a 3D image.

In addition, in the display panel 300 of the above-mentioned embodiment, even though the beam combining/splitting modulator 100 described with reference to FIGS. 1, 2A, and 2B is described as an example, it may also be possible to apply the beam combining/splitting modulator 200 described with reference to FIGS. 3, 4A, and 4B to a pixel (or a subpixel) of a display panel.

Figure 7:
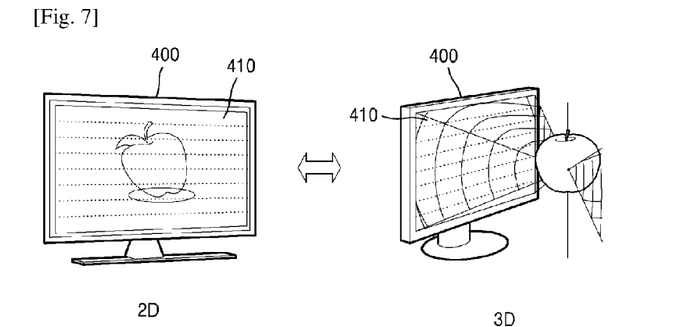
FIG. 7 schematically shows a display apparatus according to still another embodiment of the present invention.

FIG. 7 schematically shows a display apparatus 400 according to still another embodiment of the present invention. The display apparatus 400 may include a display panel 410. The display panel 410 may be the display panel 300.

As described above, since a beam combining/splitting modulator (100 of FIG. 1, and 200 of FIG. 3) applied to the display panel 410 may control a phase and an intensity of emitted light, the CGH may be displayed. Therefore, the display apparatus 400 may also function as a holographic image display apparatus. Furthermore, as described above, since the display panel 410 may also function as a multi-way 3D display panel providing a multi-view by appropriately controlling the phase of light, the display panel 410 may also function as a 3D display apparatus providing a multi-view. In addition, since the beam combining/splitting modulators 100 and 200 may selectively control only an intensity of emitted light L1 and L2, the display apparatus 400 may also function as a 2D/3D switchable stereoscopic image display apparatus.

In addition, since the beam combining/splitting modulator 100 or 200 may be implemented as a flat panel type, the display panel 410 using the beam combining/splitting modulator 100 or 200 may also be a flat panel. Furthermore, the display apparatus 400 may also be a flat panel display apparatus.

As described above, according to the one or more of the above embodiments of the present invention, a beam combining/splitting modulator and a spatial light modulation method according to the embodiments of the present invention may control a phase and an intensity of incident light.

A beam combining/splitting modulator and a spatial light modulation method according to embodiments of the present invention may emit two incident light in a state in which the two incident lights are combined or splitted.

A beam combining/splitting modulator according to the embodiments of the present invention may be used as a complex spatial light modulator (a display panel) configured to display a holographic image.

A display apparatus according to the embodiments of the present invention may be a holographic display apparatus configured to display a holographic image.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the beam combining/splitting modulator, the display apparatus using the same, and the spatial light modulating method of the present invention have been described with reference to the figures, it will be understood by those of ordinary skill in the art that various changes in form and details may be made therein without departing from the spirit and scope of the present invention as defined by the following claims.

The invention clamed is:

1. A beam combining/splitting modulator comprising:
a light modulator including first and second modulation regions for modulating light;
a polarization converter disposed at a side of an emitting surface of the light modulator, and including a first transmissive region for polarizing and converting light incident from the first modulation region to have a first polarization and a second transmissive region for polarizing and converting light incident from the second modulation region to have a second polarization;
a birefringence modulator disposed at the side of an emitting surface of the polarization converter and switching between a first state in which birefringence occurs and a second state in which birefringence does not occur; and
a polarizer disposed at the side of an emitting surface of the birefringence modulator;
wherein, when the birefringence modulator is in the first state, a light path of at least one light of the light incident from the first modulation region and the light incident from the second modulation region is changed in the birefringence modulator, the incident lights are combined, and the combined light is emitted from the birefringence modulator,
when the birefringence modulator is in the second state, the light incident from the first modulation region and the light incident from the second modulation region are emitted from the birefringence modulator without any change of light paths thereof; and
wherein a polarization axis of the polarizer is inclined with respect to the first and second polarization.

2. The beam combining/splitting modulator of claim 1, wherein the birefringence modulator includes a liquid crystal layer in which birefringence occurs according to a voltage applied thereto.

3. The beam combining/splitting modulator of claim 1, wherein the first and second modulation regions of the light modulator are a transmissive phase spatial light modulator which independently modulates a phase of incident light.

4. The beam combining/splitting modulator of claim 1, wherein light passing through the light modulator has first polarization, and wherein a first transmissive region of the polarization converter has no retardation, and a second transmissive region of the polarization converter is a region of a half-wave plate for retarding a half-wave phase.

5. A display panel comprising:
a pixel array which is displayed by a beam combining/splitting modulator and in which a plurality of pixels are arranged in a two-dimensional fashion,
wherein the beam combining/splitting modulator comprises a light modulator including first and second modulation regions for modulating light;
a polarization converter disposed at a side of an emitting surface of the light modulator, and including a first transmissive region for polarizing and converting light incident from the first modulation region to have a first polarization and a second transmissive region for polarizing and converting light incident from the second modulation region to have a second polarization;
a birefringence modulator disposed at the side of an emitting surface of the polarization converter, and switching between a first state in which birefringence occurs and a second state in which birefringence does not occur; and
a polarizer disposed at the side of an emitting surface of the birefringence modulator,
wherein each of the plurality of pixels of the pixel array includes the first and second modulation regions of the light modulator,
wherein an image is displayed by modulating a phase and an intensity of light according to a combination of light modulated in the first and second modulation regions of the light modulator;
wherein, when the birefringence modulator is in the first state, a light path of at least one light of the light incident from the first modulation region and the light incident from the second modulation region is changed in the birefringence modulator, the incident lights are combined, and the combined light is emitted from the birefringence modulator,
when the birefringence modulator is in the second state, the light incident from the first modulation region and the light incident from the second modulation region are emitted from the birefringence modulator without any change of light paths thereof; and
wherein a polarization axis of the polarizer is inclined with respect to the first and second polarization.

6. A display apparatus comprising:
a display panel including a pixel array which is displayed by a beam combining/splitting modulator and in which a plurality of pixels are arranged in a two-dimensional fashion,
wherein the beam combining/splitting modulator comprises a light modulator including first and second modulation regions for modulating light;
a polarization converter disposed at a side of an emitting surface of the light modulator and including a first transmissive region for polarizing and converting light incident from the first modulation region to have a first polarization and a second transmissive region for polarizing and converting light incident from the second modulation to have a second polarization;
a birefringence modulator disposed at the side of the emitting surface of the polarization converter and switching between a first state in which birefringence occurs and a second state in which birefringence does not occur; and a polarizer disposed at the side of an emitting surface of the birefringence modulator, wherein each of the plurality of pixels of the pixel array includes the first and second modulation regions of the light modulator, and wherein an image is displayed by modulating a phase and an intensity of light according to a combination of light modulated in the first and second modulation regions of the light modulator, thereby adjusting a phase and an intensity of light emitted in front of the display panel;

wherein, when the birefringence modulator is in the first state, a light path of at least one light of the light incident from the first modulation region and the light incident from the second modulation region is changed in the birefringence modulator, the incident lights are combined, and the combined light is emitted from the birefringence modulator, when the birefringence modulator is in the second state, the light incident from the first modulation region and the light incident from the second modulation region are emitted from the birefringence modulator without any change of light paths thereof; and wherein a polarization axis of the polarizer is inclined with respect to the first and second polarization.

7. The display apparatus of claim 6, wherein the display apparatus is a holographic display apparatus for modulating a phase and an intensity of light emitted from the display panel to display a hologram image.

8. The display apparatus of claim 6, wherein the display panel displays a two-dimensional (2D) image that is a one-view image regardless of a phase of emitted light.

9. The display apparatus of claim 6, wherein a phase and an intensity of light emitted from the display panel are selectively adjustable for switching between a 2D image and a three-dimensional (3D) image.

10. A spatial light modulation method comprising:

modulating light incident on first and second modulation regions of a light modulator;

polarizing and converting, by a polarization converter, light passing through the first modulation region to have a first polarization and light passing through the second modulation region to have a second polarization;

causing the polarized and converted light to be incident on a birefringence modulator;

controlling the birefringence modulator so that the birefringence modulator is in any one of a first state in which birefringence occurs and a second state in which birefringence dose not occur; and passing light that has passed through the birefringence modulator through a polarizer;

wherein, when the birefringence modulator is in the first state, the causing the polarized and converted light to be incident on the birefringence modulator comprises changing, in the birefringence modulator, a light path of at least one light of the light incident from the first modulation region and the light incident from the second modulation region, combining the incident lights, and emitting the combined light is from the birefringence modulator, and when the birefringence modulator is in the second state, the causing the polarized and converted light to be incident on the birefringence modulator comprises emitting, the light incident from the first modulation region and the light incident from the second modulation region from the birefringence modulator without any change of light paths thereof; and wherein a polarization axis of the polarizer is inclined with respect to the first and second polarization.

\* \* \* \* \*